United States Patent
Kim et al.

(10) Patent No.: US 10,677,234 B2
(45) Date of Patent: Jun. 9, 2020

(54) RECIPROCATING COMPRESSOR AND METHOD FOR MANUFACTURING A RECIPROCATING COMPRESSOR

(71) Applicant: LG ELECTRONICS INC., Seoul (KR)

(72) Inventors: Dowan Kim, Seoul (KR); Jongkeun Kim, Seoul (KR); Jaeho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 15/839,963

(22) Filed: Dec. 13, 2017

(65) Prior Publication Data

US 2019/0120221 A1  Apr. 25, 2019

(30) Foreign Application Priority Data

Oct. 24, 2017 (KR) .................. 10-2017-0138434

(51) Int. Cl.
  *F04B 39/00* (2006.01)
  *F04B 39/12* (2006.01)
  *B29C 45/14* (2006.01)
  *F04B 35/04* (2006.01)

(52) U.S. Cl.
  CPC .......... *F04B 39/0044* (2013.01); *B29C 45/14* (2013.01); *F04B 39/121* (2013.01); *F04B 39/122* (2013.01); *F04B 39/127* (2013.01); *F04B 35/04* (2013.01); *F04B 39/0061* (2013.01)

(58) Field of Classification Search
  CPC .............. F04B 39/0044; F04B 39/0061; F04B 39/123; F04B 39/122; F04B 39/121; F04B 39/127; F04B 39/14; F04B 35/04; B29C 45/14
  See application file for complete search history.

(56) References Cited

U.S. PATENT DOCUMENTS

| 2,721,028 | A | * | 10/1955 | Dills | ...................... F04B 39/12 181/200 |
| 4,010,235 | A | * | 3/1977 | Yardley | .................... C08J 5/121 264/241 |
| 9,695,903 | B2 | * | 7/2017 | Hirai | ................... F04B 39/0044 |
| 10,180,131 | B2 | * | 1/2019 | Kim | ........................ F04B 39/10 |

(Continued)

FOREIGN PATENT DOCUMENTS

| DE | 4109095 | 9/1992 |
| JP | 58-41308 | 9/1983 |

(Continued)

OTHER PUBLICATIONS

European Search Report dated Aug. 9, 2018.
Korean Office Action dated Dec. 20, 2017.

*Primary Examiner* — Nathan C Zollinger
(74) *Attorney, Agent, or Firm* — KED & Associates LLP

(57) ABSTRACT

A reciprocating compressor and a method for manufacturing a reciprocating compressor are provided. The reciprocating compressor may include a damper provided at a cylinder block. The damper may include a damper base coupled to the cylinder block and formed of plastic, and a rubber damping portion provided on the damper base to prevent contact between the damper base and the shell, so that friction noise between a base and the shell of the compressor may be reduced.

16 Claims, 15 Drawing Sheets

(56) References Cited

U.S. PATENT DOCUMENTS

| | | | | |
|---|---|---|---|---|
| 10,267,301 | B2* | 4/2019 | Kim | F04B 39/123 |
| 10,329,419 | B2* | 6/2019 | Gu | C08K 3/00 |
| 2004/0096341 | A1* | 5/2004 | Hung | F04B 35/06 |
| | | | | 417/363 |
| 2008/0159887 | A1* | 7/2008 | Schogler | F04B 39/0044 |
| | | | | 417/415 |
| 2018/0087494 | A1* | 3/2018 | Brune | B32B 27/32 |
| 2019/0271301 | A1* | 9/2019 | Steen | F04B 39/0044 |
| 2020/0018302 | A1* | 1/2020 | Kim | F04B 39/0044 |

FOREIGN PATENT DOCUMENTS

| | | | |
|---|---|---|---|
| KR | 10-2010-0085760 | | 7/2010 |
| KR | 10-2016-0055529 | | 5/2016 |
| KR | 10-2016-0055530 | | 5/2016 |
| KR | 20160055529 A | * | 5/2016 |
| WO | WO 2016/166320 | | 10/2016 |

* cited by examiner

RECIPROCATING COMPRESSOR AND METHOD FOR MANUFACTURING A RECIPROCATING COMPRESSOR

CROSS-REFERENCE TO RELATED APPLICATION(S)

This application claims priority under 35 U.S.C. 119 and 35 U.S.C. 365 to Korean Patent Application No. 10-2017-0138434 filed on Oct. 24, 2017 in Korea, the entire contents of which is hereby incorporated by reference in its entirety.

BACKGROUND

1. Field

A reciprocating compressor and a method for manufacturing a reciprocating compressor are disclosed herein.

2. Background

A reciprocating compressor refers to an apparatus configured to compress fluid by suction, compressing, and discharging a refrigerant through a reciprocating movement of a piston inside of a cylinder. The reciprocating compressor may be classified into a connection-type reciprocating compressor and a vibration-type reciprocating compressor according to a drive scheme of the piston. The connection-type reciprocating compressor uses a scheme in which a piston connected to a rotary shaft of a drive unit through a connecting rod reciprocates inside of a cylinder to compress a refrigerant, and the vibration-type reciprocating compressor uses a scheme in which a piston connected to a mover of a reciprocating motor to vibrate reciprocates inside of a cylinder to compress a refrigerant.

A connection-type reciprocating compressor according to the related art is disclosed in Korean Patent Application Publication No. 10-2010-0085760, which is hereby incorporated by reference. The connection-type reciprocating compressor disclosed in this publication includes a housing shell defining a sealed space, a drive unit provided inside of the housing shell to provide a drive force, a compression unit connected to a rotary shaft of the drive unit and configured to compress a refrigerant using the drive force from the drive unit as a piston reciprocates inside of a cylinder, and a suctioning/discharging unit through which the refrigerant is introduced and discharged once compressed through a reciprocating movement of the compression unit. The suctioning/discharging unit has a discharge hose connected to a suction pipe mounted on the housing shell to discharge the compressed refrigerant to the outside of the compressor.

However, in the reciprocating compressor according to the related art, because a mechanism, that is, the drive unit or the compression unit, of the compressor comes into contact with a shell due to vibration generated when the compressor is carried or operated, a large amount of friction noise occurs, and the mechanism is damaged. Further, the discharge hose may collide with or be caught in a structure, such as an inner wall of a compressor shell, and the mechanism during the vibration. Such an impact may cause a damage to the discharge hose depending on a degree thereof. Furthermore, in the reciprocating compressor according to the related art, when the discharge hole is biased toward the inner wall of the housing shell while the housing shell is welded, the discharge hose may be melted due to welding heat.

BRIEF DESCRIPTION OF THE DRAWINGS

Embodiments will be described in detail with reference to the following drawings in which like reference numerals refer to like elements, and wherein.

DETAILED DESCRIPTION

Embodiments will become more apparent by describing an exemplary embodiment with reference to the accompanying drawings. Embodiments described herein will be illustratively provided to assist in understanding, and it should be understood that the embodiments may be variously modified, which is unlike the embodiments described herein. Further, in order to assist in understanding, the accompanying drawings are not illustrated to an actual scale, but dimensions of some components may be exaggeratedly illustrated.

Figure 1:
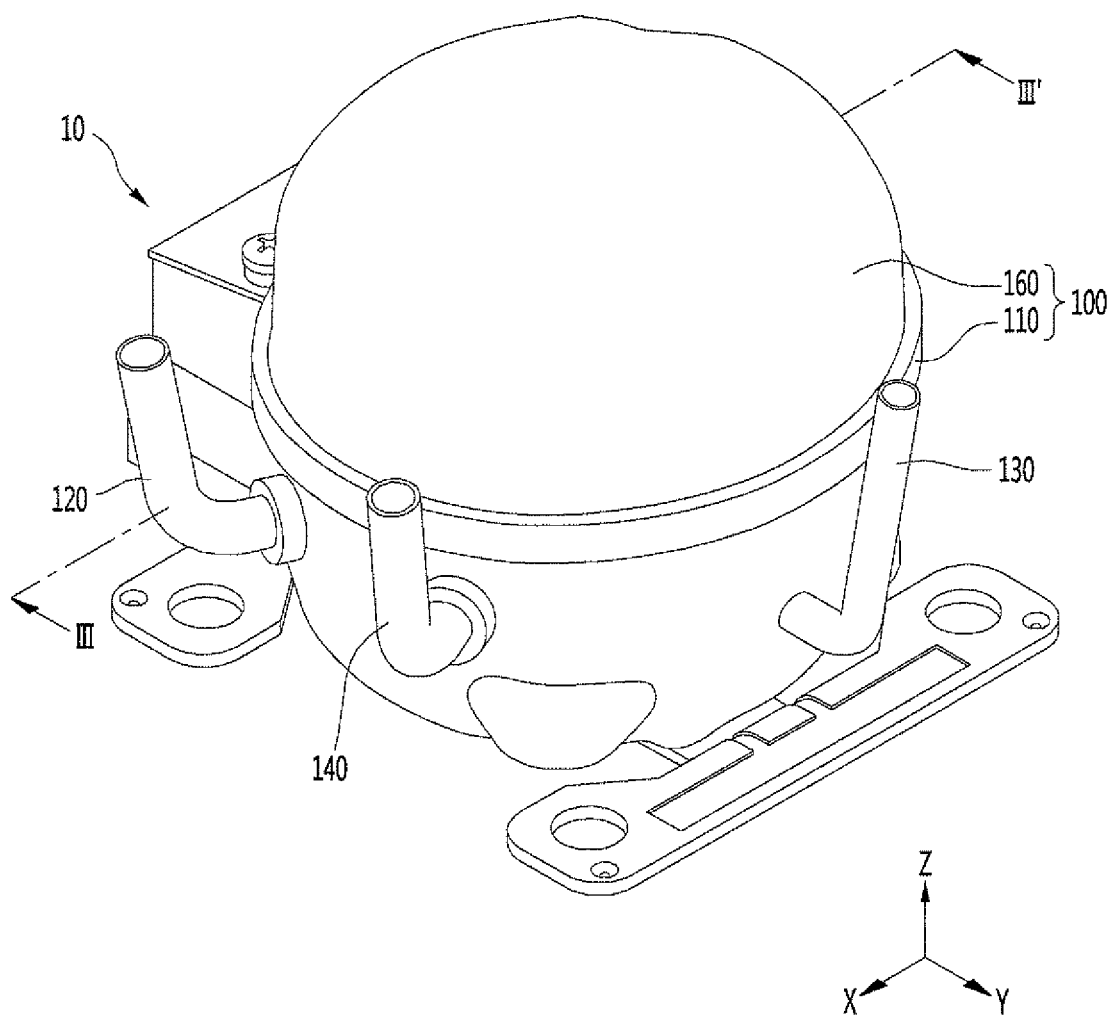
FIG. 1 is a perspective view illustrating a reciprocating compressor according to an embodiment.
Figure 2:
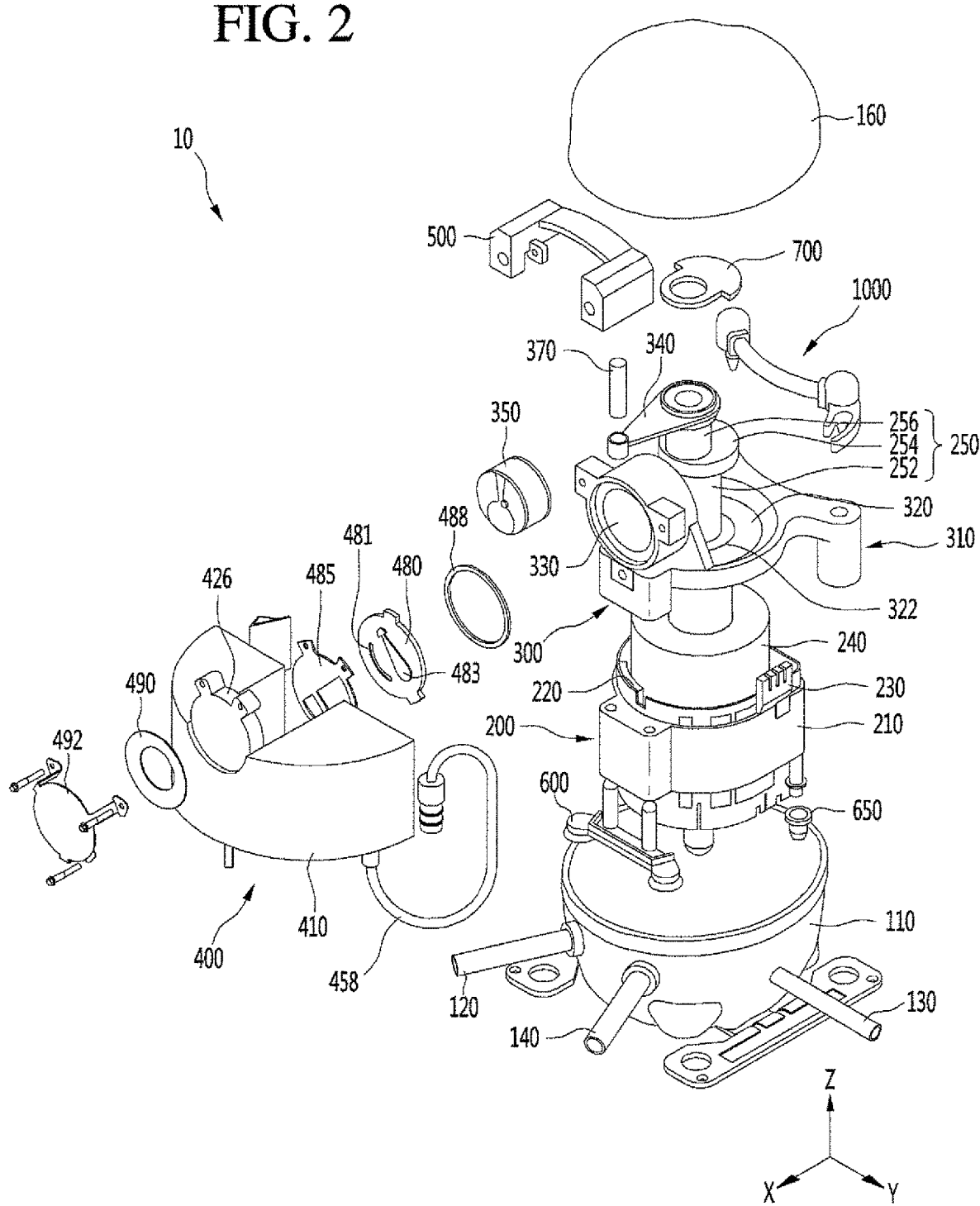
FIG. 2 is an exploded perspective view illustrating the reciprocating compressor according to the embodiment.
Figure 3:
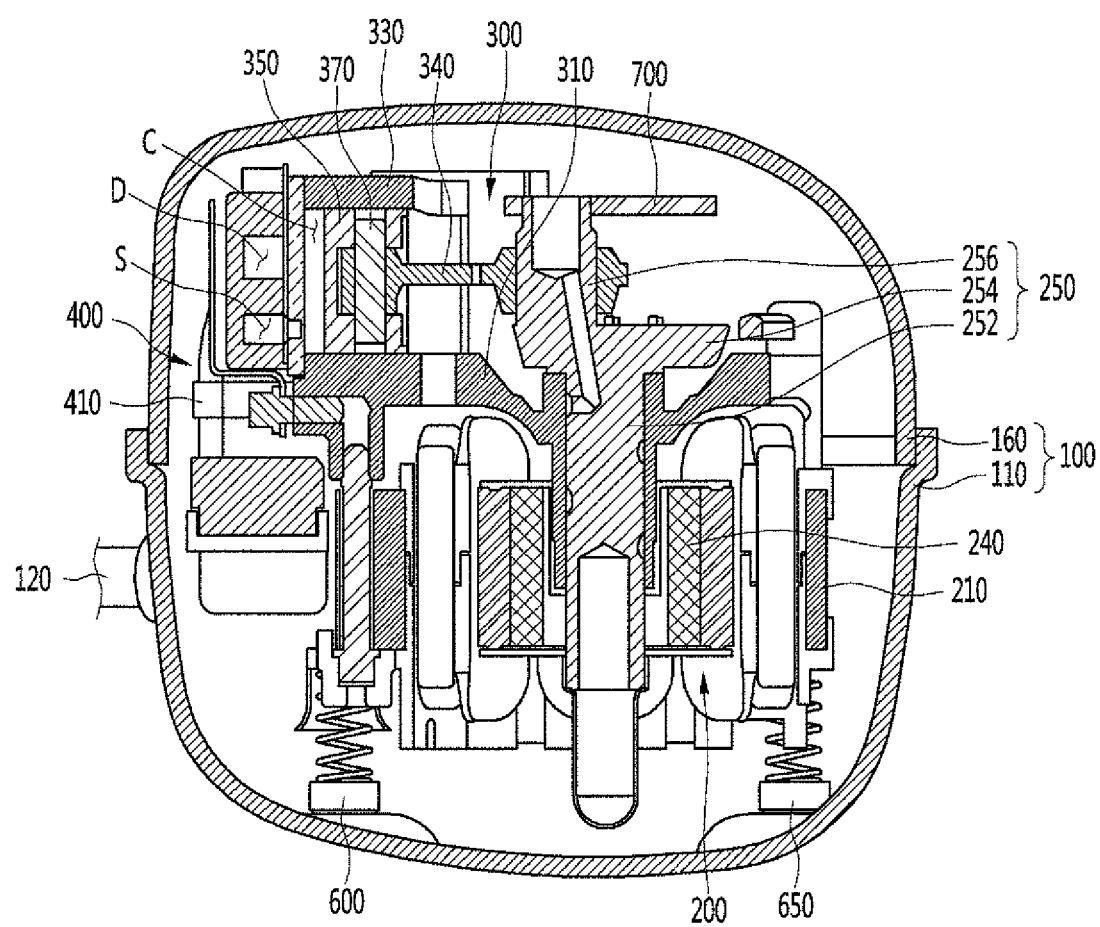
FIG. 3 is a sectional view taken along line III-III' of FIG. 1.

FIG. 1 is a perspective view illustrating a reciprocating compressor according to an embodiment. FIG. 2 is an exploded perspective view illustrating the reciprocating compressor according to the embodiment. FIG. 3 is a sectional view taken along line of FIG. 1.

Referring to FIGS. 1 to 3, a reciprocating compressor 10 according to the embodiment may include a shell defining an outer appearance, and a mechanism provided in an inner space of the shell 100. The mechanism may include a drive unit 200 configured to provide a drive force, a compression unit 300 configured to receive the drive force from the drive unit 200 to linearly reciprocate so as to compress a refrigerant, and a suctioning/discharging unit 400 configured to suction a refrigerant for compressing the refrigerant of the compression unit 300 and discharge the compressed refrigerant from the compression unit 300.

The shell 100 has a sealed space formed therein, and various kinds of components constituting the compressor 10 may be accommodated in the sealed space. The shell 100 may be formed of metal, for example, steel, and include a lower shell 110 and an upper shell 160.

The lower shell 110 may have an approximately semispherical shape, and the lower shell 110 and the upper shell 160 together may define an accommodation space that accommodates the drive unit 200, the compression unit 300, the discharge unit 400, and various kinds of components constituting the compressor 10. The lower shell 110 may be referred to as a "compressor body", and the upper shell 160 may be referred to as a "compressor cover".

A suction pipe 120, a discharge pipe 130, a process pipe 140, and a power supply (not illustrated) may be provided in the lower shell 110. The suction pipe 120 may introduce the refrigerant into the shell 100, and be coupled to the lower shell 110. The suction pipe 120 may be separately mounted on the lower shell 110 or may be formed integrally with the lower shell 110.

The discharge pipe 130 may discharge the refrigerant compressed inside the shell 100, and be coupled to the lower shell 110. Also, the discharge pipe 130 may be separately mounted on the lower shell 110 or may be formed integrally with the lower shell 110.

A discharge hose 459 of the suctioning/discharging unit 400, which will be described hereinafter, may be connected to the discharge pipe 130. The refrigerant introduced into the suction pipe 120 and compressed through the compression unit 300 may be discharged to the discharge pipe 130 via the discharge hose 458 of the suctioning/discharging unit 400. The discharge hose 458 may be formed of plastic, for example.

The process pipe 140, which is a device configured to seal an inside of the shell 100, and then fill the inside of the shell 100 with the refrigerant, may be coupled to the lower shell 110 together with the suction pipe 120 and the discharge pipe 130.

The upper shell 160 may define the accommodation space together with the lower shell 110, and may be formed to have an approximately semi-spherical shape, which is like the lower shell 110. The upper shell 160 packages the lower shell 110 on the upper side of the lower shell 110, to define a sealed space therein.

The drive unit 200 may include stators 210 and 220, an insulator 230, a rotor 240, and a rotary shaft 250. The stators 210 and 220 may be components fixed while the drive unit 200 is driven, and may include a stator core 210 and a stator coil 220.

The stator core 210 may be formed of metal and may have an approximately hollow cylindrical shape. Further, the stator coil 220 may be mounted inside of the stator core 210. When electric power is applied from the outside, the stator coil 220 may generate an electromagnetic force to perform an electromagnetic interaction together with the stator core 220 and the rotor 240. Through this, the drive unit 200 may generate a drive force for a reciprocating movement of the compression unit 300.

The insulator 230 may be arranged between the stator core 210 and the stator coil 220, and prevent a direct contact between the stator core 210 and the stator coil 220. When the stator coil 220 comes into direct contact with the stator core 210, generation of an electromagnetic force from the stator coil 220 may be hindered. Thus, the structure is for preventing the hindrance. The insulator 230 may space the stator core 210 and the stator coil 220 apart from each other by a predetermined distance.

The rotor 240, which is a part rotated while the drive unit 200 is driven, may be rotatably provided inside of the stator coil 220, and may be installed inside of the insulator 230. A magnet may be provided in the rotor 240. When electric power is supplied from the outside, the rotor 240 rotates through an electromagnetic interaction between the stator core 210 and the stator coil 220. A rotational force generated by the rotation of the rotor 240 acts as a drive force which may drive the compression unit 200.

The rotary shaft 250 may be installed inside of the rotor 240, may be mounted to vertically pass through the rotor 240, and may be rotated together with the rotor 240. Further, the rotary shaft 250 may be connected to a connecting rod 340, which will be described hereinafter, to transfer the rotational force generated by the rotor 240 to the compression unit 300.

The rotary shaft 250 may include a base shaft 252, a rotating plate 254, and an eccentric shaft 256. The base shaft 252 may be mounted inside of the rotor 240 in a vertical direction (a Z-axis direction) or a longitudinal direction, and may be inserted into a shaft inserting part or portion 322 of a cylinder block 310. When the rotor 240 is rotated, the base shaft 252 may be rotated together with the rotor 240.

The rotating plate 254 may be provided above the base shaft 252, and may be rotatably mounted on a rotating plate seating part or seat 320 of the cylinder block 310. The eccentric shaft 256 may protrude upward from an upper surface of the rotating plate 254. The eccentric shaft 256 may protrude from a position eccentric from an axial center of the base shaft 252 and be eccentrically rotated when the rotating plate 254 rotates. The connecting rod 340, which will be described hereinafter, may be mounted on the eccentric shaft 256. As the eccentric shaft 256 is eccentrically rotated, the connecting rod 340 may linearly reciprocates in a frontward-rearward direction (X-axis direction).

The compression unit 300 may include the cylinder block 310, the connecting rod 340, a piston 350, and a piston pin 370. The cylinder block 310 may be provided in the drive unit 200, more specifically, on an upper side of the rotor 240, and may be mounted inside of the shell 100. The cylinder block 310 may include the rotating plate seating part 320 and a cylinder 330.

The rotating plate seating part 320 may be located below the cylinder block 310, and rotatably accommodate the rotating plate 254. The cylinder block 310 may include the shaft inserting part 322 into which the rotary shaft 250 may be inserted. The shaft inserting part 322 may extend upward and downward from the rotating plate seating part 320.

The cylinder 330 may be provided in front of the cylinder block 310, and be arranged to accommodate the piston 350, which will be described hereinafter. The piston 350 may reciprocate in the frontward-rearward direction (X-axis direction), and a compression space C in which the refrigerant may be compressed may be formed inside of the cylinder 330. The cylinder 330 may be formed of metal, for example, steel.

As another example, the cylinder 330 may be formed of aluminum. For example, the cylinder 330 may be formed of aluminum or aluminum alloy. A magnetic flux generated in the rotor 240 is not transferred to the cylinder 330 due to aluminum which is a nonmagnetic material. Accordingly, the magnetic flux generated in the rotor 240 may be prevented from being transferred to the cylinder 330 and leaking to the outside of the cylinder 330.

The connecting rod 340, which is a device configured to transfer the drive force provided from the drive unit 200 to the piston 350, converts a rotational movement of the rotary shaft 250 into a linear reciprocating movement. The connecting rod 340 may linearly reciprocate in the frontward-rearward direction (X-axis direction) when the rotary shaft 250 rotates. The connecting rod 340 may be formed of sintered alloy, for example.

The piston 350, which is a device configured to compress the refrigerant, may be accommodated inside of the cylinder 330 to reciprocate in the frontward-rearward direction (X-axis direction). The piston 350 may be connected to the connecting rod 340. The piston 350 may linearly reciprocate inside of the cylinder 330 according to movement of the connecting rod 340. As the piston 350 reciprocates, the refrigerant introduced from the suction pipe 120 may be compressed inside of the cylinder 330.

The piston 350 may be formed of a same material as that of the cylinder 330 and may have almost a same thermal expansion coefficient as the cylinder 330. As the piston 350 has almost the same thermal expansion coefficient, the piston 350 may be thermally deformed by almost the same amount as that of the cylinder 330 in an internal environment of the shell 100 at a high temperature (generally, approximately 100° C.) when the compressor 10 is driven. Thus, when the piston 350 reciprocates inside of the cylinder 330, interference between the piston 350 and the cylinder 330 may be prevented from occurring.

For example, when the cylinder 330 is formed of aluminum, the piston 350 may be formed of an aluminum material, for example, aluminum or aluminum alloy. Thus, the magnetic flux generated in the rotor 240 may be prevented from leaking to the outside through the piston 350.

The piston pin 370 may couple the piston 350 and the connecting rod 340. The piston pin 370 may pass through the piston 350 and the connecting rod 340 in a vertical direction (Z-axis direction) to connect the piston 350 and the connecting rod 340.

The suctioning/discharging unit 400 may include a muffler assembly 410, a valve assembly 480, the discharge hose 458, a plurality of gaskets 485 and 488, an elastic member 490, and a support clamp 492. The muffler assembly 410 may transfer the refrigerant suctioned from the suction pipe 120 to an inside of the cylinder 330, and transfer the refrigerant compressed in the compression space C of the cylinder 330 to the discharge pipe 130. A suction space S that accommodates the refrigerant suctioned from the suction pipe 120 and a discharge space D that accommodates the refrigerant compressed in the compression space C of the cylinder 330 are provided in the muffler assembly 410.

The refrigerant suctioned from the suction pipe 120 may be introduced into the suction space S of a suctioning/discharging tank 426 via a suction muffler of the muffler assembly 410. Further, the refrigerant compressed in the cylinder 330 may be discharged to the outside of the compressor through the discharge hose 458 via the discharge space D of the suctioning/discharging tank 426 and a discharge muffler.

The valve assembly 480 may guide the refrigerant of the suction space S to the inside of the cylinder 330 or guide the refrigerant compressed in the cylinder to the discharge space D. A discharge valve which may be opened/closed to discharge the refrigerant compressed in the compression space C to the discharge space D may be provided on a front surface of the valve assembly 480, and a suction valve which may be opened/closed to discharge the refrigerant of the suction space S to the compression space C of the cylinder 330 may be provided on a rear surface of the valve assembly 480.

Effects of the discharge valve and the suction valve will be described hereinafter.

When the refrigerant compressed in the compression space C inside of the cylinder 330 is discharged, the discharge valve is opened and the suction valve is closed. Accordingly, the refrigerant compressed inside of the cylinder 330 may not be introduced into the suction space S and may be introduced into the discharge space D. In contrast, when the refrigerant introduced into the suction space S inside of the cylinder 330 is suctioned, the discharge valve is closed and the suction valve is opened. Accordingly, the refrigerant of the suction space S may not be introduced into the discharge space D and may be introduced into the cylinder 330.

The discharge hose 458, which is a device configured to transfer the refrigerant accommodated and compressed in the discharge space D to the discharge pipe 130, may be coupled to the muffler assembly 410. One or a first side or end of the discharge hose 458 may be coupled to the muffler assembly 410 to communicate with the discharge space D, and the other or a second side or end of the discharge hose 458 may be coupled to the discharge pipe 130.

The plurality of gaskets 485 and 488, which are devices configured to prevent the refrigerant from leaking, may be mounted on one or a first side and the other or a second side of the valve assembly 420, respectively. The plurality of gaskets 485 and 488 may include first gasket 485 and second gasket 488. The first gasket 485 may be mounted on a front side of the valve assembly 480, and the second gasket 488 may be mounted on a rear side of the valve assembly 480. Although the first gasket 485 and the second gasket 488 may have an approximately ring shape, embodiments are not limited thereto. Further, the first gasket 485 and the second gasket 488 may be properly changed to a structure that may prevent the refrigerant from leaking, depending on a design thereof.

The elastic member 490, which is a device configured to support the muffler assembly 410 when the compressor 10 is driven, may be mounted on a front side of the muffler assembly 410. The elastic member 490 may include a Belleville spring, for example.

The support clamp 492 may fix the valve assembly 480, the first gasket 485, the second gasket 488, and the elastic member 490 to the muffler assembly 410. The support clamp 492 may have an approximately tripod shape, and may be mounted on the muffler assembly 410 through a fastening unit or fastener, such as a screw member or screw.

In addition, the compressor 10 further includes a plurality of damper members or dampers 500, 600, and 650, and a balance weight 700. The plurality of damper members 500, 550, 600, and 650 damp vibration, for example, of internal structures, which is generated when the compressor 10 is driven. The plurality of damper members 500, 550, 600, and 650 may include a front damper 500 and lower dampers 600 and 650.

The front damper 500 may damp vibration of the suctioning/discharging unit 400, and may be formed of rubber, for example. The front damper 500 may be coupled to an upper portion of a front side of the cylinder block 310 through the fastening unit coupled to the support clamp 492. Further, the front damper 500 may be arranged to surround at least a portion of an upper portion of the cylinder 330 and at least a portion of an upper portion of the muffler assembly

410. The front damper 500 may be arranged to be closer to an upper inner wall of the shell 100 than the cylinder 330 and the muffler assembly 410.

The lower dampers 600 and 650 may damp vibration of the drive unit 200. The plurality of lower dampers 600 and 650 may include a front lower damper 600 and a rear lower damper 650. The front lower damper 600 may damp vibration on a front side of the drive unit 200, and may be mounted on a lower side of a front side of the stator core 210. The rear lower damper 650 may damp vibration on a rear side of the drive unit 200, and may be mounted on a lower side of a rear side of the stator core 210.

The balance weight 700, which is a device configured to control rotational vibration when the rotary shaft 250 of the drive unit 200 is rotated, may be coupled to the eccentric shaft 256 of the rotary shaft 250 on an upper side of the connecting rod 340.

The plurality of damper members may further include a rear damper 1000 provided on or at a rear side of the mechanism to damp vibration generated in the mechanism. For example, the rear damper 1000 may be mounted on an upper portion of the rear side of the cylinder block 310. Hereinafter, the rear damper 1000 (hereinafter, referred to as a "damper") will be described with reference to the drawings.

Figure 4:
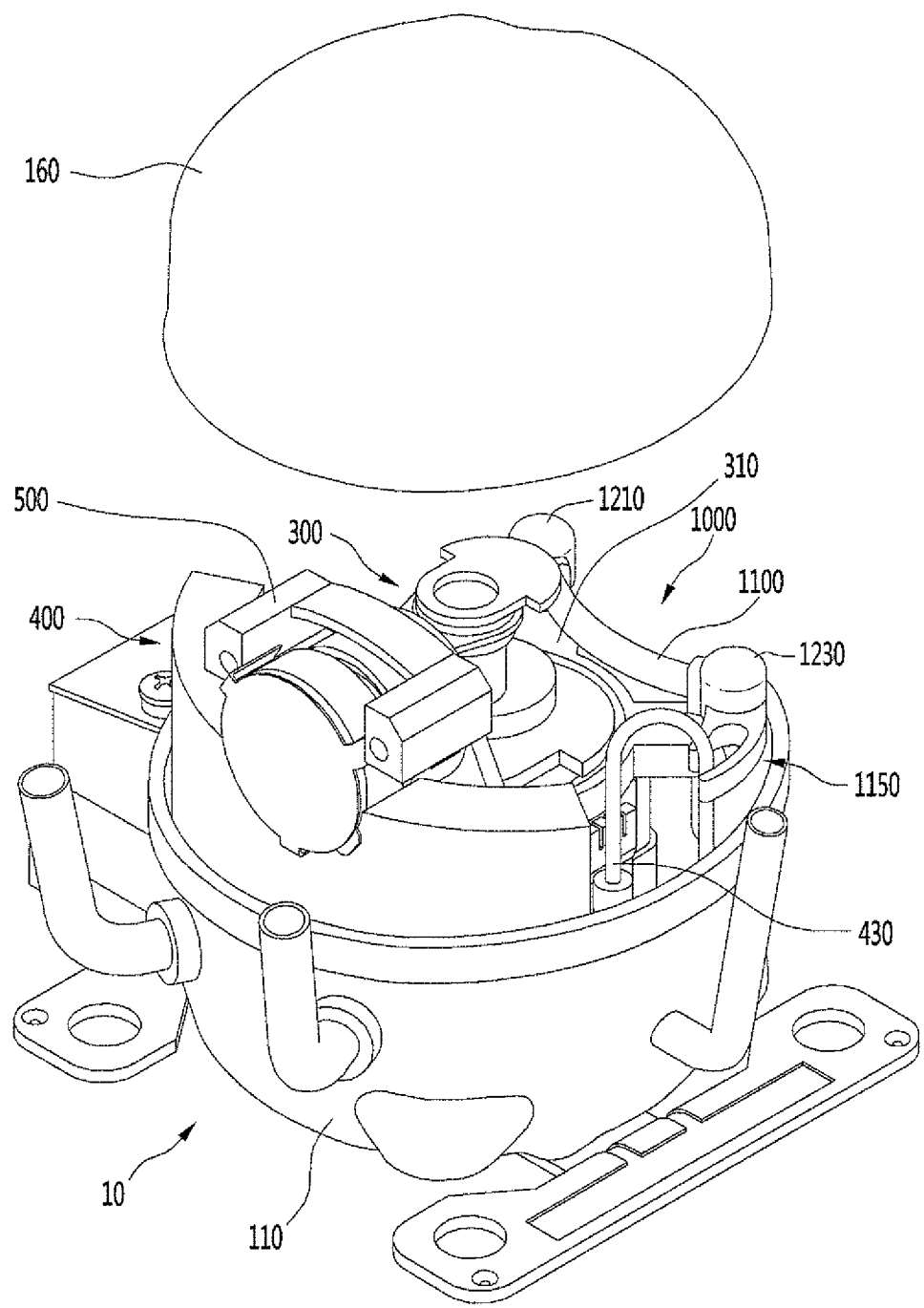
FIG. 4 is a view illustrating a state in which a damper is provided at an upper portion of the rear side of a shell according to the embodiment.
Figure 5:
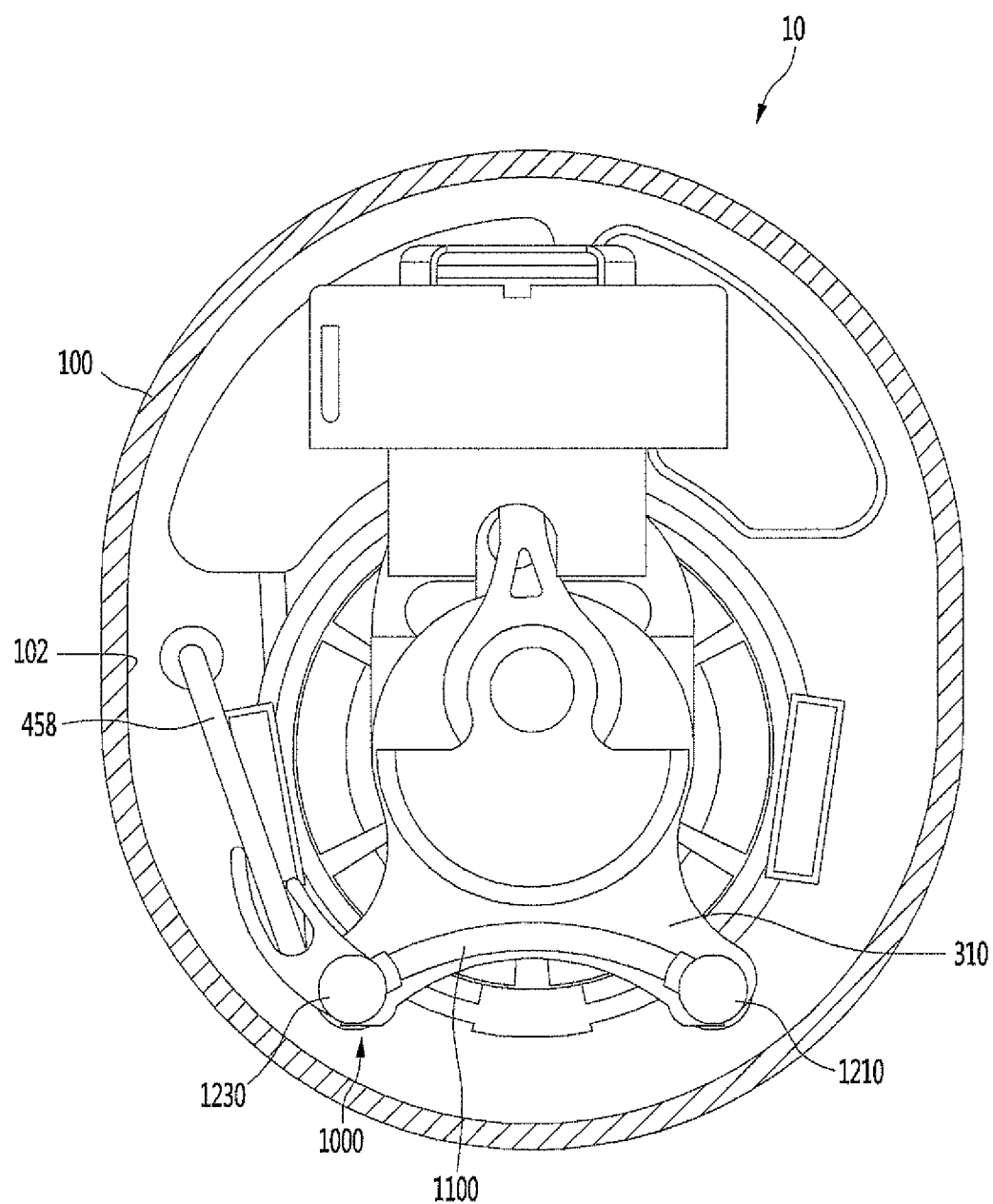
FIG. 5 is a plan view illustrating an internal configuration of the reciprocating compressor according to the embodiment.
Figure 6:
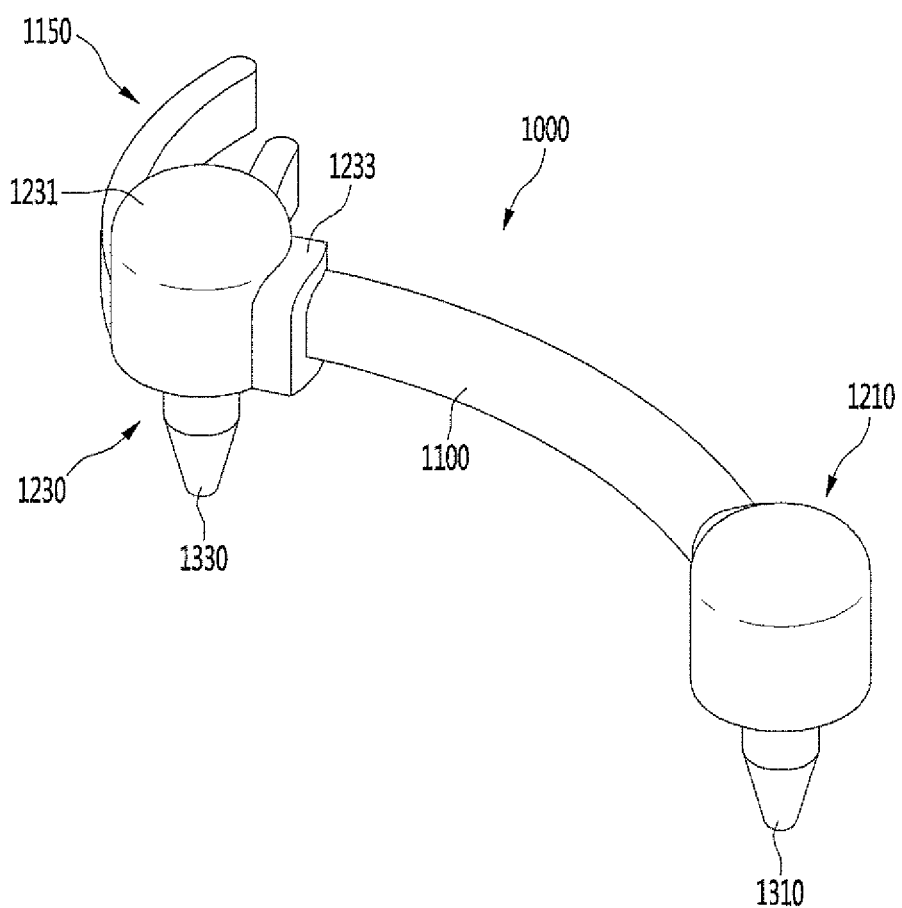
FIG. 6 is a perspective view illustrating a configuration of the damper according to the embodiment.
Figure 7:
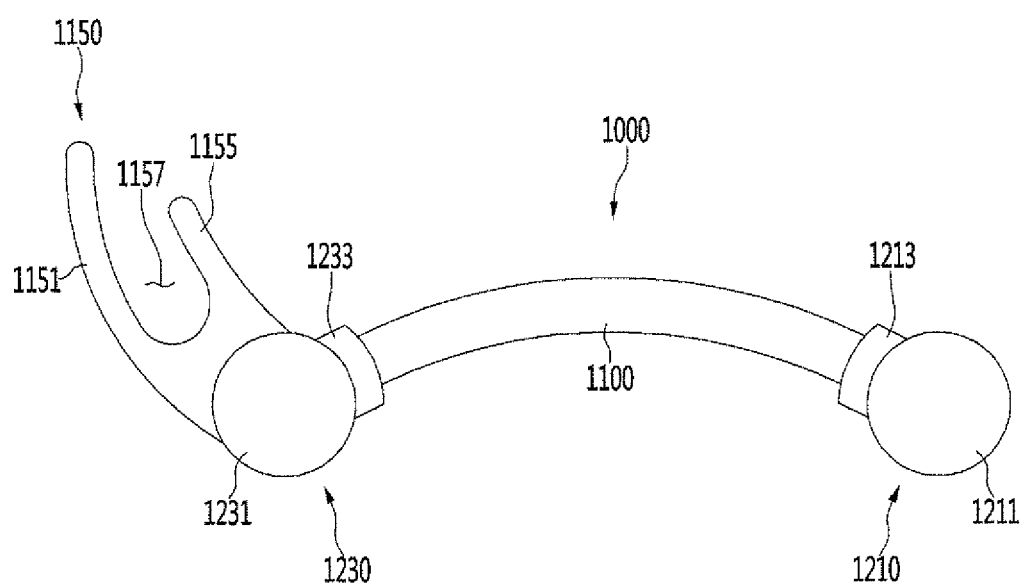
FIG. 7 is a plan view illustrating a configuration of the damper according to the embodiment.
Figure 8:
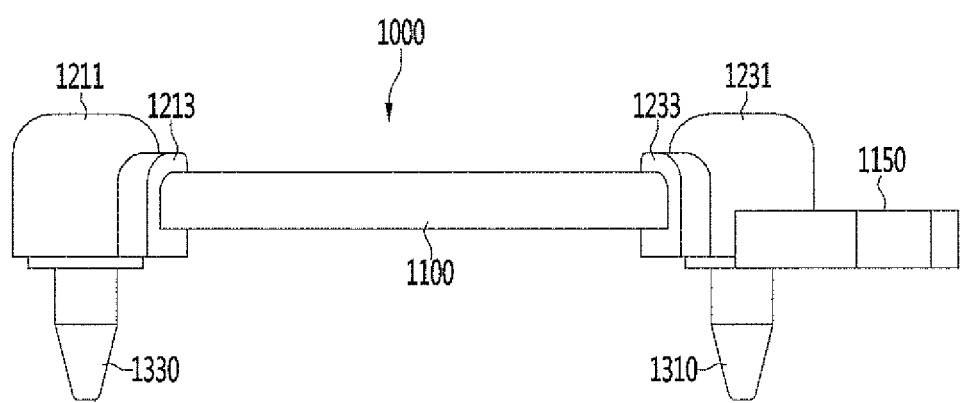
FIG. 8 is a front view illustrating a configuration of the damper according to the embodiment.

FIG. 4 is a view illustrating a state in which a damper is provided at an upper portion of the rear side of a shell according to the embodiment. FIG. 5 is a plan view illustrating an internal configuration of the reciprocating compressor according to the embodiment. FIG. 6 is a perspective view illustrating a configuration of the damper according to the embodiment. FIG. 7 is a plan view illustrating a configuration of the damper according to the embodiment. FIG. 8 is a front view illustrating a configuration of the damper according to the embodiment.

Referring to FIGS. 4 to 8, the damper 1000 according to the embodiment may be arranged at an upper portion of a rear side of the inner space of the shell 100. A "front side" may be understood as a direction in which a piston moves forward so that the refrigerant in the cylinder 300 is compressed, and a "rear side" may be understood as a direction in which the piston moves rearward so that the refrigerant is suctioned into the cylinder 300.

The damper 1000 may be provided at an upper portion of the rear side of the cylinder block 310, and when vibration is generated in the compressor 10, function to damp an impact between the mechanism and the shell 100 if an upper portion of the rear side of the mechanism moves toward an inner surface of the shell 100. The damper 1000 may be configured by combining plastic and rubber, for example.

The damper 1000 may include a damper body 1100 that extends in a left-right or lateral direction. For example, the damper body 1100 may extend to be rounded at a predetermined curvature, and may have a bar shape. The damper body 1100 may be formed of plastic having a predetermined elasticity, for example.

The damper 1000 has first and second protrusions 1110 and 1120 (see FIG. 9A) that protrudes from opposite sides of the damper body 1100. The first and second protrusions 1110 and 1120 may have approximately cylindrical shapes, and may vertically extends from the opposite sides of the damper body 1100.

The damper 1000 may further include first and second damping parts or portions 1210 and 1230 provided on the opposite sides of the damper body 1100. The first and second damping parts 1210 and 1230 may be arranged to surround outer surfaces of the first and second protrusions 1110 and 1120, respectively. Further, the first and second damping parts 1210 and 1230 may be formed of rubber, for example, thereby improving a damping effect. The first and second damping parts 1210 and 1230 may be referred to as "rubber damping parts".

The first and second damping parts 1210 and 1230 may have the same configuration. That is, the first damping part 1210 may include a first part or portion 1211 having an approximately cylindrical shape to surround the first protrusion 1110, and a second part or portion 1213 that extends from the first part 1211 toward the damper body 1100 to surround one or a first side of the damper body 1100.

The first protrusion 1110 may not be exposed to the outside due to the first part 1211. Further, the first and second parts 1211 and 1213 may be configured to surround the first protrusion 1110 and the one or a second side of the damper body 1100, so that even when vibration is generated in the compressor 10, the first damping part 1210 may be prevented from being separated from the first protrusion 1110 and the damper body 1100.

The second damping part 1230 may include a first part or portion 1231 having an approximately cylindrical shape to surround the second protrusion 1120, and a second part or portion 1233 that extends from the first part 1231 toward the damper body 1100 to surround the other or a second side of the damper body 1100. The second protrusion 1120 may not be exposed to the outside due to the first part 1231. Further, the first and second parts 1231 and 1233 may be configured to surround the second protrusion 1120 and the other side of the damper body 1100, so that even when vibration is generated in the compressor 10, the second damping part 1230 may be prevented from being separated from the second protrusion 1120 and the damper body 1100.

The damper 1000 may further include insertion protrusions 1310 and 1330 that protrudes downward from the first and second protrusions 1110 and 1120, respectively. The insertion protrusions 1310 and 1330 may include a first insertion protrusion 1310 that extends downward from the first protrusion 1110 and coupled to a first insertion hole 331a of the cylinder block 310. A size of the first insertion protrusion 1310 may be smaller than a size of the first protrusion 1110. Thus, when the first insertion protrusion 1310 is inserted into the first insertion hole 331a, the first protrusion 1110 may be supported on the upper surface of the rotating plate seating part 320 in which the first insertion hole 331a is formed.

The insertion protrusions 1330 and 1330 may include a second insertion protrusion 1330 that extends downward from the second protrusion 1120 and coupled to a second insertion hole 332a of the cylinder block 310. A size of the second insertion protrusion 1330 may be smaller than a size of the second protrusion 1120. Thus, when the second insertion protrusion 1330 is inserted into the second insertion hole 332a, the first protrusion 1120 may be supported on the upper surface of the rotating plate seating part 320 in which the second insertion hole 332a is formed.

The damper 1000 may further include a clamp 1150 that supports the discharge hose 458. The clamp 1150 may be arranged to extend sideways from the second protrusion 1120. Further, the clamp 1150 may be located in a space between an inner wall of the shell 100 and the discharge hose 458 to prevent the discharge hose 458 from coming into contact with the inner wall of the shell 100.

The clamp 1150 may include a first clamping part or portion 1151 extends from a first point on an outer peripheral surface of the second protrusion 1120 and a second clamping part or portion 1155 that extends from a second point on an outer peripheral surface of the second protrusion 1120. The first and second clamping parts 1151 and 1155 may be coupled to each other and may be formed integrally with each other.

The first and second clamping parts 1151 and 1155 may have a shape of tongs as a whole. Further, a length of the first clamping part 1151 may be larger than a length of the second clamping part 1155.

A hose accommodating space 1157 in which the discharge hose 458 is located may be defined between at least a portion of the first clamping part 1151 and at least a portion of the second clamping part 1155. The discharge hose 458 may be fitted in the hose accommodating space 1157 so that a position of the discharge hose 458 may be fixed by the first and second clamping parts 1151 and 1155.

Figure 9A:
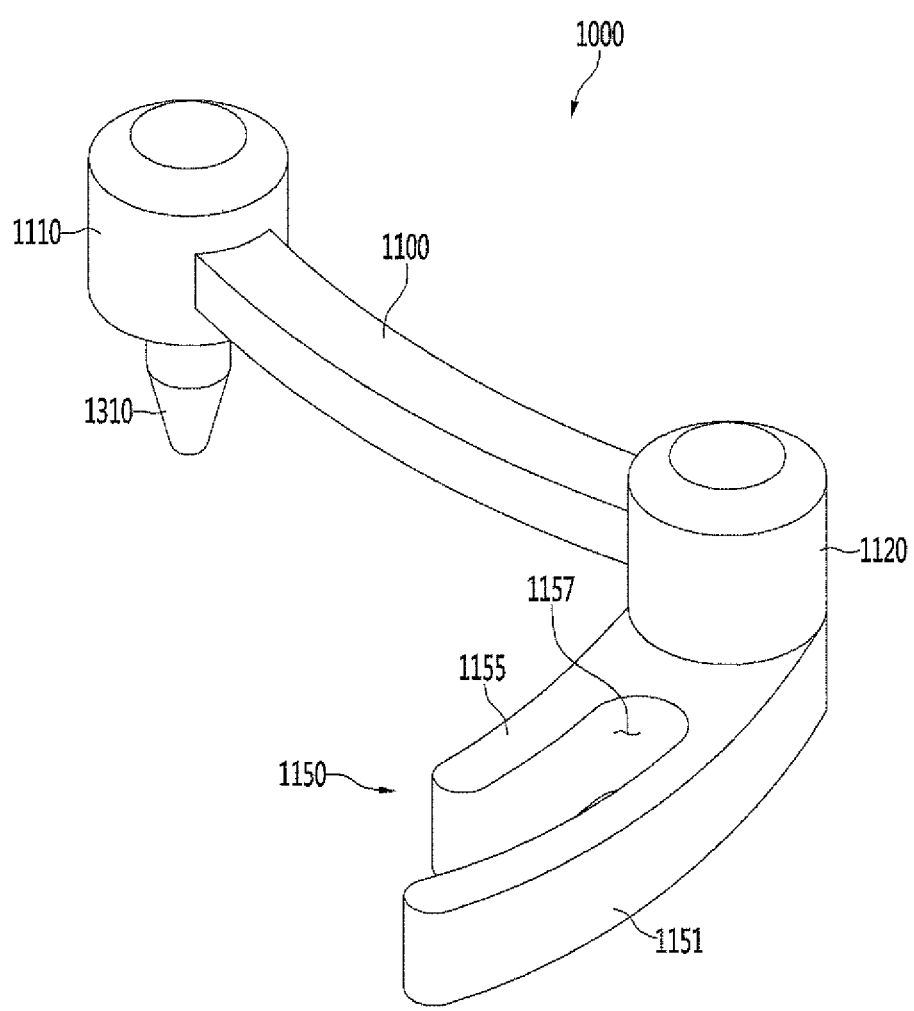
FIG. 9A is a view illustrating a configuration of the damper before a rubber damping part is formed in the damper according to the embodiment.
Figure 9B:
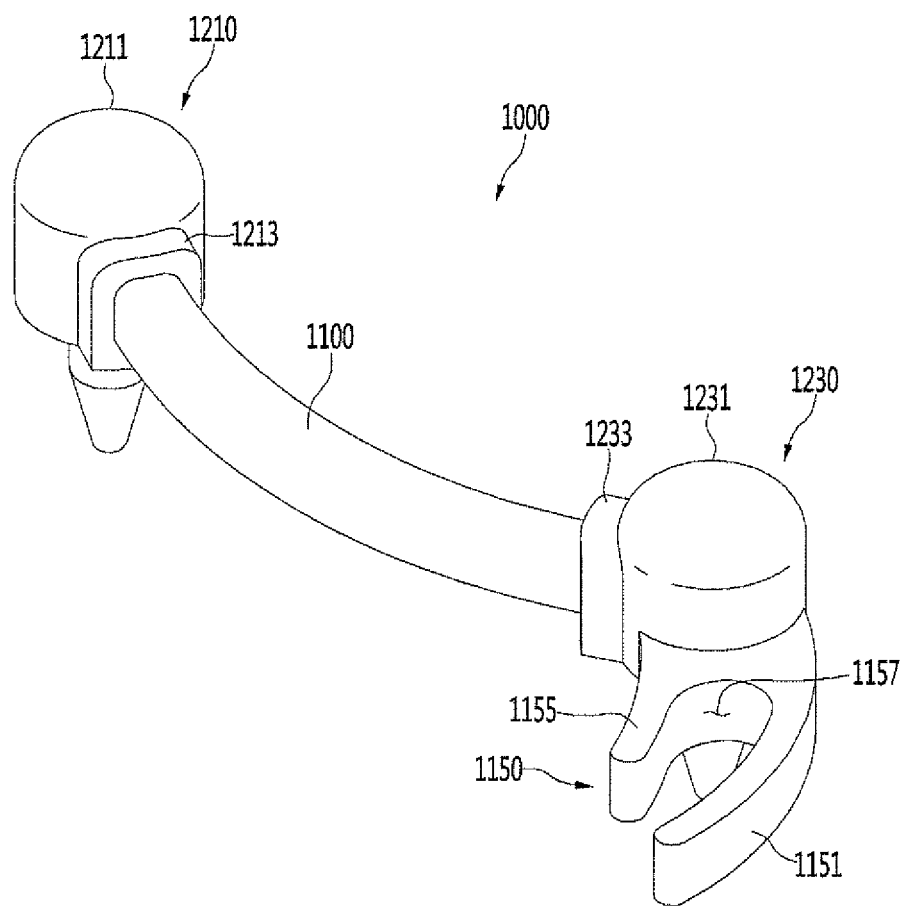
FIG. 9B is a view illustrating a configuration of the damper after the rubber damping part is formed.

FIG. 9A is a view illustrating a configuration of the damper before a rubber damping part is formed in the damper according to the embodiment. FIG. 9B is a view illustrating a configuration of the damper after the rubber damping part is formed.

Referring to FIG. 9A, the damper body 1100, the first and second protrusions 1110 and 1120, the first and second insertion protrusions 1310 and 1330, and the clamp 1150 according to the embodiment may be integrally formed, and may be formed of plastic, for example. For convenience of description, the damper body 1100, the first and second protrusions 1110 and 1120, the first and second insertion protrusions 1310 and 1330, and the clamp 1150 may be collectively referred to as a "damper base material" or "damper base". FIG. 9A illustrates a configuration of the damper base material.

Referring to FIG. 9B, the first and second damping parts 1210 and 1230 may be formed, for example, by integral injection to the damper base material. For example, the first and second damping parts 1210 and 1230 may be formed, for example, by insert-injecting rubber into the damper base material. That is, because the damper base material and the first and second damping parts 1210 and 1230 are integrally formed without a separate fastening scheme, a stable coupling state may be maintained.

Further, the first parts 1211 and 1231 of the first and second damping parts 1210 and 1230 may be configured to surround the first and second protrusions 1110 and 1120 so as to prevent the first and second protrusions 1110 and 1120 from coming into contact with the inner wall of the shell 100. Because the first and second protrusions 1110 and 1120 among the damper base material are arranged at a highest position, a probability that the first and second protrusions 1110 and 1120 come into contact with the inner wall of the shell 100 when vibration is generated in the compressor 10 increases.

Furthermore, when the first and second protrusions 1110 and 1120 come into contact with the inner wall of the shell 100, the first and second protrusions 1110 and 1120 formed of plastic may be damaged, and friction noise between the first and second protrusions 1110 and 1120 and the inner wall of the shell 100 formed of metal may be greatly generated. In this embodiment, the first and second damping parts 1210 and 1230 are arranged outside the first and second protrusions 1110 and 1120 to surround the first and second protrusions 1110 and 1120, so that the above-described problem may be prevented.

Figure 10:
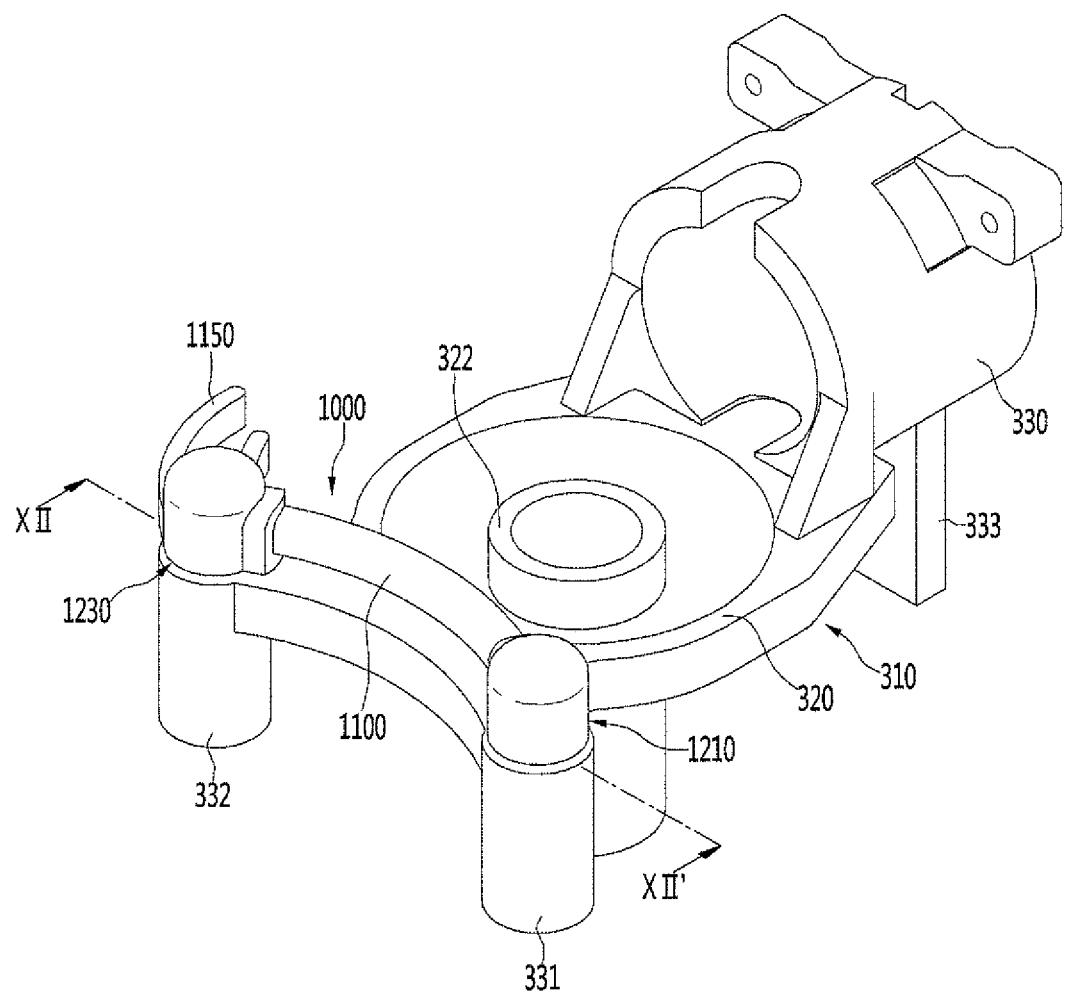
FIG. 10 is a perspective view illustrating a state in which the damper is coupled to a cylinder block according to the embodiment.
Figure 11:
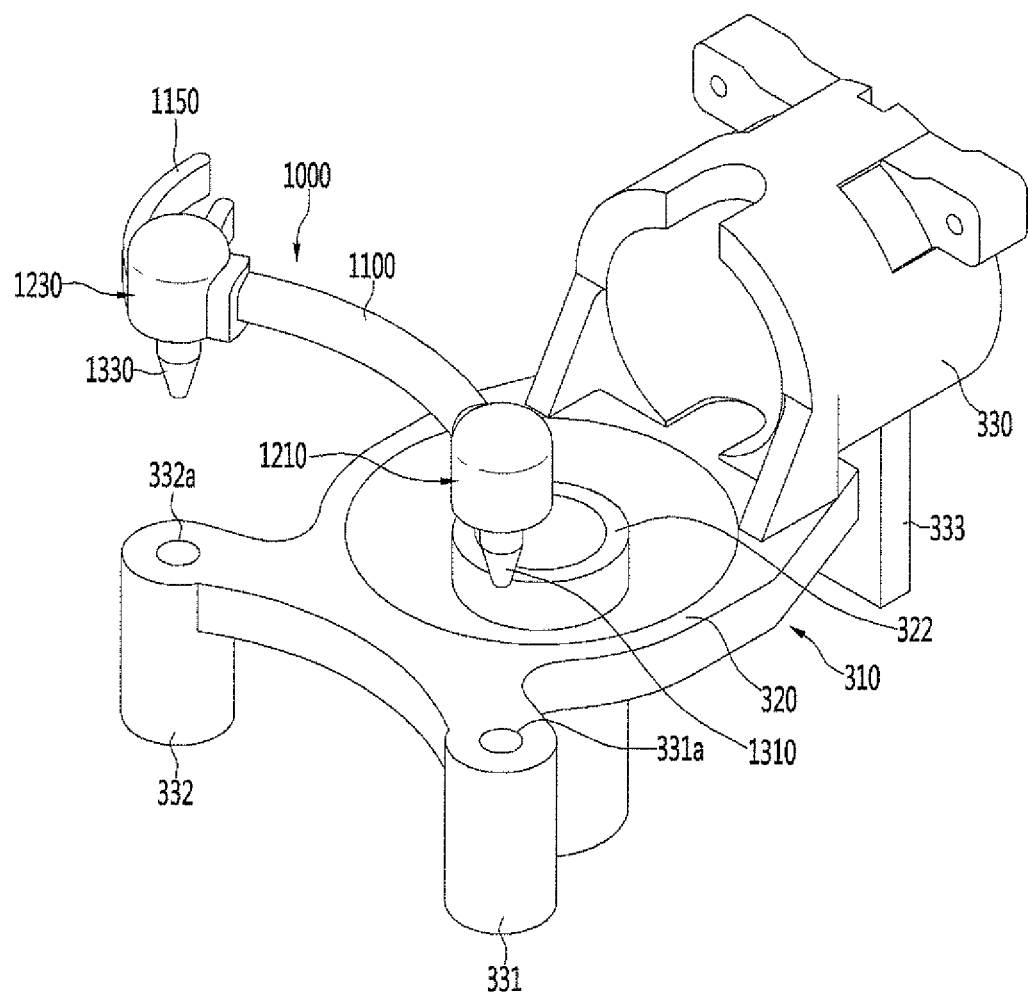
FIG. 11 is an exploded perspective view illustrating the damper and the cylinder block according to the embodiment.
Figure 12:
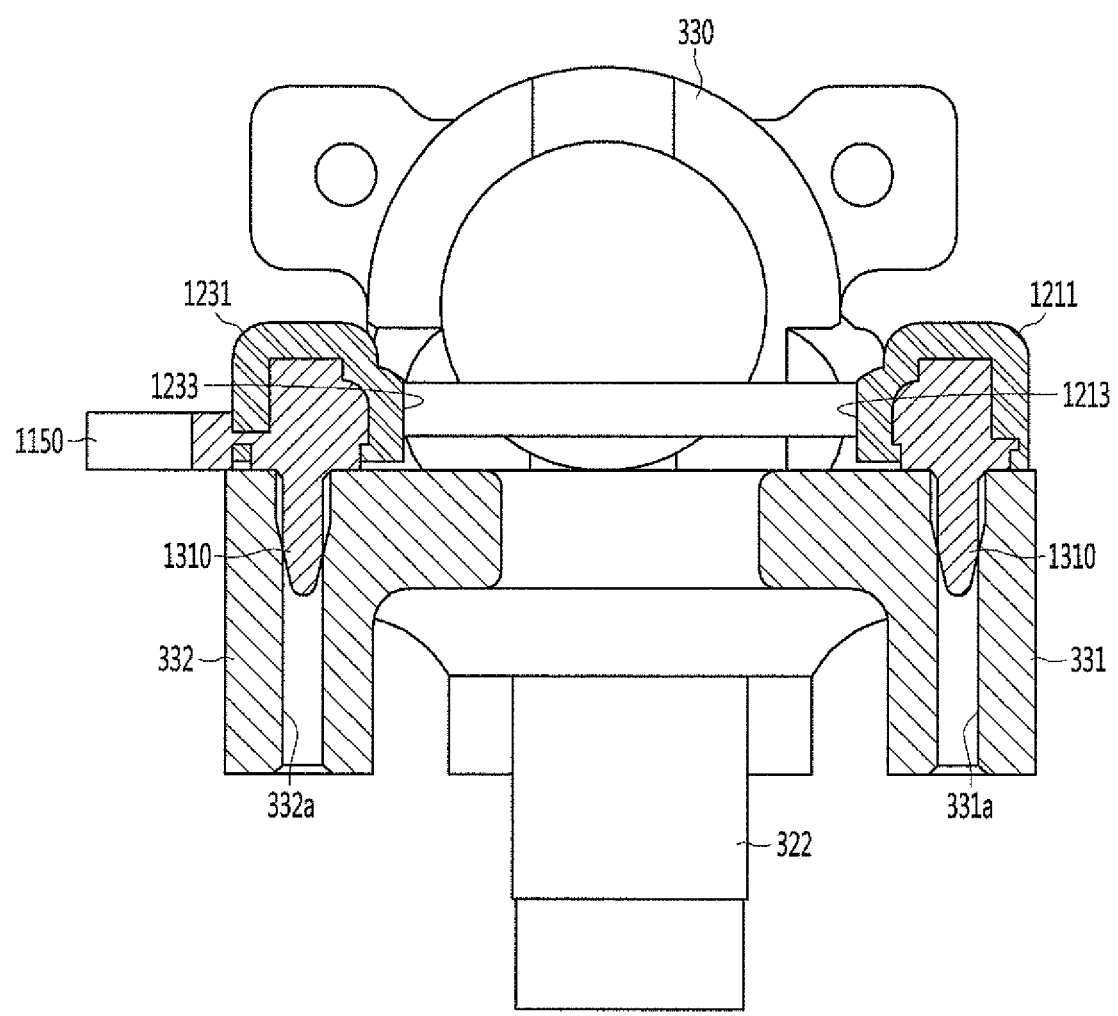
FIG. 12 is a sectional view taken along line XII-XII' of FIG. 10.
Figure 13:
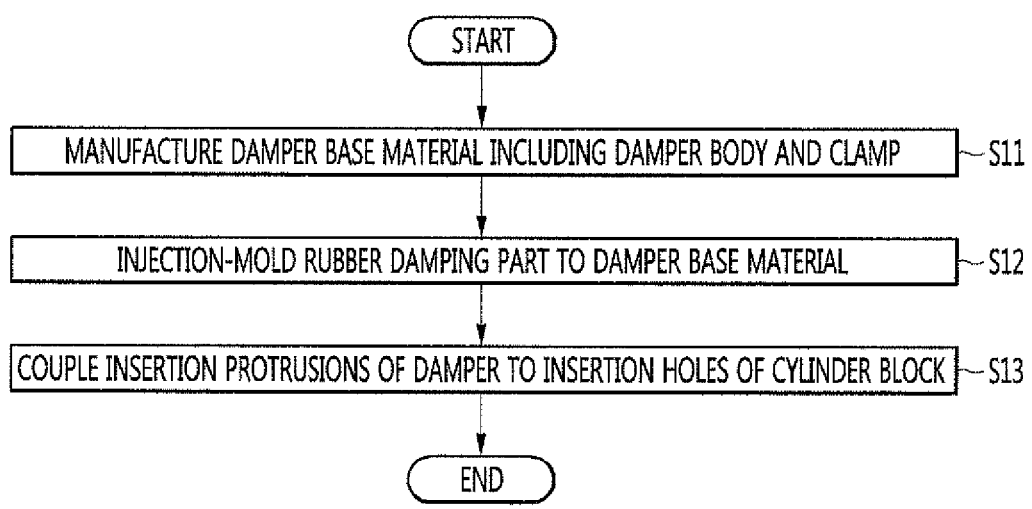
FIG. 13 is a flowchart illustrating a method for assembling the compressor according to the embodiment.

FIG. 10 is a perspective view illustrating a state in which the damper is coupled to a cylinder block according to the embodiment. FIG. 11 is an exploded perspective view illustrating the damper and the cylinder block according to the embodiment of the present disclosure, FIG. 12 is a sectional view taken along line XII-XII' of FIG. 10. FIG. 13 is a flowchart illustrating a method for assembling the compressor according to the embodiment.

Referring to FIGS. 10 to 12, the damper 1000 according to the embodiment may be coupled to the cylinder block 310. The cylinder block 310 may include the rotating plate seating part 320 having an approximately flat plate shape, and the shaft inserting part 322 passing through a central portion of the rotating plate seating part 320 to extend vertically. The rotary shaft 250, particularly, the base shaft 252 may be inserted into the shaft inserting part 322.

The cylinder block 310 may include block legs 331, 332, and 333 that extend downward from the rotating plate seating part 320. The block legs 331, 332, and 33 may be supported on an upper side of the stators 210 and 220.

The block legs 331, 332, and 333 may include first and second block legs 331 and 332 provided on opposite sides of a rear side of the rotating plate seating part 320. The first and second block legs 331 and 332 may be supported on an upper side of a rear portion of the stators 210 and 220. Further, the damper 1000 may be supported on upper surfaces of the first and second block legs 331 and 332.

The first insertion hole 331a to which the first insertion protrusion 1310 of the damper 1000 may be coupled may be formed in the rotating plate seating part 320. Further, the first insertion hole 331a may be depressed downward from the upper surface of the first block leg 331. The first insertion protrusion 1310 may be inserted into the first insertion hole 331a from an upper side of the first insertion hole 331a.

The first insertion hole 331a may pass through the first block leg 331 from the upper surface to a lower surface of the first block leg 331. A fastening member for fastening the stators 210 and 220 and the first block leg 331 may be coupled to the first insertion hole 331a. That is, the fastening member may pass through the stators 210 and 220 to be inserted into a lower portion of the first insertion hole 331a, so as to couple the stators 210 and 220 and the first block leg 331 to each other.

The second insertion hole 332a to which the second insertion protrusion 1330 of the damper 1000 may be coupled may be formed in the rotating plate seating part 320. Further, the second insertion hole 332a may be depressed downward from the upper surface of the second block leg 333. The second insertion protrusion 1330 may be inserted into the second insertion hole 332a from an upper side of the second insertion hole 332a.

The second insertion hole 332a may pass through the second block leg 333 from the upper surface to a lower surface of the second block leg 333. A fastening member for fastening the stators 210 and 220 and the second block leg 333 may be coupled to the second insertion hole 332a. That is, the fastening member may pass through the stators 210 and 220 to be inserted into a lower portion of the second insertion hole 332a, so as to couple the stators 210 and 220 and the second block leg 333 to each other.

The block legs 331, 332, and 333 may include a third block leg 333 provided on a front side of the rotating plate seating part 320. The third block leg 333 may be supported on the upper side of a front side of the stators 210 and 220. The cylinder block 310 may be stably supported on the stators 210 and 220 due to the block legs 331, 332, and 333.

A method for manufacturing and assembling the damper 100 according to the embodiment will be described with reference to FIG. 13. First, the damper base material, that is, the damper body 1100, the first and second protrusions 1110 and 1120, the first and second insertion protrusions 1310 and 1330, and the clamp 1150 may be integrally manufactured (S11). The damper base material may be formed of plastic, for example.

The rubber damping part, that is, the first and second damping parts 1210 and 1230 may be provided in the damper base material. The first and second damping parts 1210 and 1230 may be integrally formed in the damper base material through an insert injection scheme (S12).

The first and second damping parts 1210 and 1230 may be arranged to surround the first and second protrusions 1110 and 1120 and portions of opposite sides of the damper body 1100, so as to prevent the first and second protrusions 1110 and 1120 and the damper body 1100 from being separated from the damper base material (S12).

When the damper 1000 is completely manufactured as the rubber damping part is formed integrally with the damper base material, the first and second insertion protrusions 1310 and 1330 may be coupled to the first and second insertion holes 33a and 332a of the cylinder block 310 (S13). The first and second damping parts 1210 and 1230 among rear configurations of the cylinder block 310 may be located to be closest to the inner wall of the shell 100 due to such coupling. Thus, because the first and second damping parts 1210 and 1230 come into contact with the inner wall of the shell 100 when vibration is generated in the compressor 100, friction noise may be reduced, and the mechanism provided inside the shell 100 may be prevented from being damaged.

Figure 14:
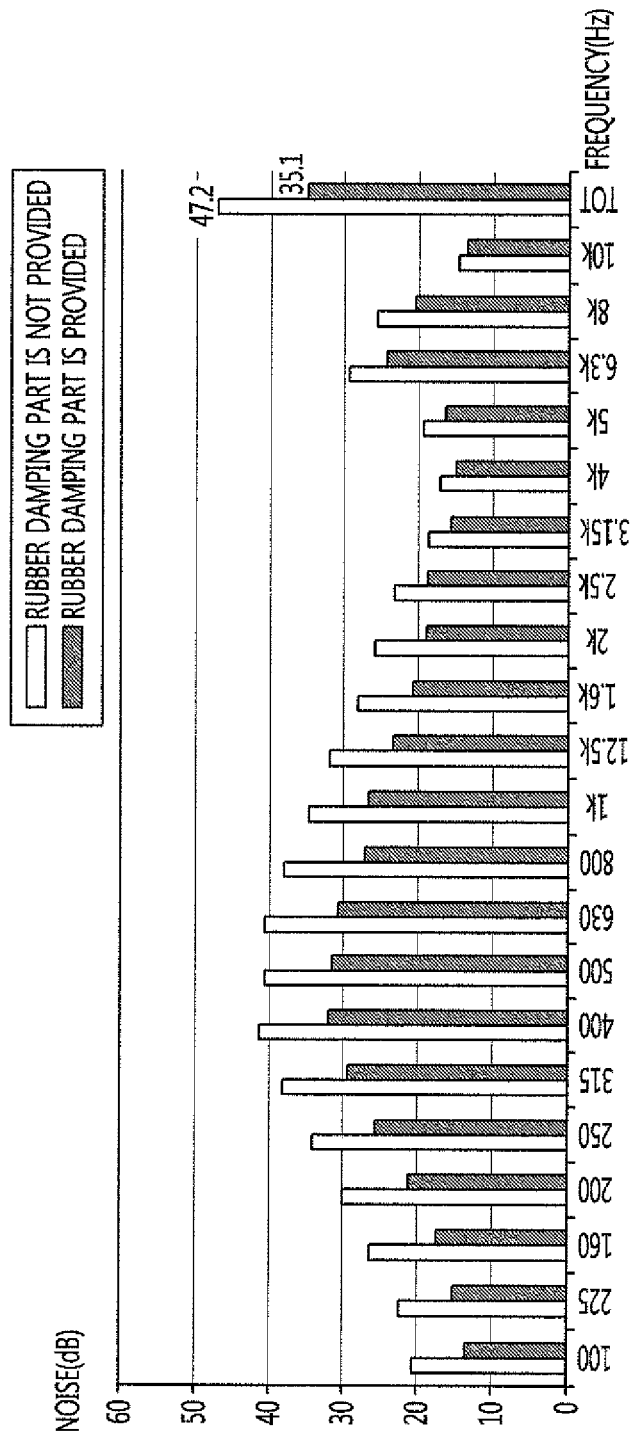
FIG. 14 is an experimental graph illustrating a noise reducing effect when the rubber damping part is provided in the damper according to the embodiment.

FIG. 14 is an experimental graph illustrating a noise reducing effect when the rubber damping part is provided in the damper according to the embodiment. FIG. 14 is a graph depicting an effect of reducing noise if the rubber damping parts 1210 and 1230 are provided in the damper 1000 according to the embodiment, when vibration is generated while the compressor 10 according to the embodiment is driven or carried.

Noise data generated with respect to the damper 1000 according to the embodiment, and noise data generated with respect to the damper base material not having the rubber damping parts as a control group for comparison with the embodiment are illustrated comparably. A horizontal axis refers to a vibration frequency (Hz) applied to the compressor, and a vertical axis refers to noise according to contact between the shell 100 and the damper/damper base material according to the vibration frequency.

As illustrated in FIG. 14, it can be identified that a magnitude of noise generated in the damper 1000 according to the embodiment may be smaller than a magnitude of noise generated in the control group throughout an entire range of the vibration frequency (Hz). Further, it can be identified that the noise generated in the embodiment is averagely 35.1 dB, and the noise generated in the control group is 47.2 dB. That is, the rubber damping parts are provided in the damper 1000, so that a noise reduction effect of averagely 10 dB or more may be obtained.

Embodiments have been conceived to solve the above-described problems and provide a reciprocating compressor configured to prevent contact noise between a mechanism and a shell of the compressor from being generated by vibration generated in the compressor. Embodiments provide a reciprocating compressor which prevents generation of noise according to vibration generated while the compressor is carried and noise according to vibration generated while the compressor is operated. Further, embodiments provide a reciprocating compressor which may prevent a damage to a discharge hose.

A reciprocating compressor according to an embodiment may include a damper provided at an upper portion of a rear side of a cylinder block. The damper may include a damper base material coupled to the cylinder block and formed of plastic, and a rubber damping part provided in the damper base material to prevent contact between the damper base material and the shell, so that friction noise between a mechanism and the shell of the compressor may be reduced. The rubber damping part may be insert-injection-molded to the damper base material, so that the damper base material and the rubber damping part may be stably coupled to each other.

A rotating plate seating part or seat of the cylinder block may include insertion holes to which the damper may be coupled. In particular, the reciprocating compressor may include a block leg that extends downward from the rotating plate seating part and supported on the stator. Because the insertion holes are formed on the upper surface of the block leg, the damper may be stably supported on the cylinder block.

The damper base material may include a damper body, protrusions provided on at least one side of the damper body, and insertion protrusions that extends downward from the protrusions and coupled to the insertion holes. The rubber damping part may include a first part or portion that surrounds the protrusions, and a second part or portion that extends from the first part toward the damper body, and surrounding at least a portion of the damper body, so that the rubber damping part may be firmly coupled to the damper body and the protrusions.

The reciprocating compressor may further include a discharge hose that extends from the muffler assembly toward the discharge pipe, and a clamp having first and second clamping parts or portions defining a hose accommodating space, to support the discharge hose. The clamp may extend from the protrusions, so that the discharge hose may be prevented from being in contact with an inner wall of the shell of the compressor.

A method for manufacturing a reciprocating compressor according to an embodiment may include manufacturing a damper base material having a damper body, first and second protrusions provided on opposite sides of the damper body, and first and second insertion protrusions that extend downward from the first and second protrusions, respectively, manufacturing a damper by injection-molding first and second damping parts to the first and second protrusions of the damper base material, and supporting the damper on the cylinder block by inserting the first and second insertion protrusions into insertion holes of a cylinder block. The manufacturing of the damper may include arranging first parts or portion of the first and second damping parts to surround the first and second protrusions, and arranging second parts or portion of the first and second damping parts to surround the damper body.

According to the reciprocating compressor according to embodiments, because the damper is provided in the cylinder block, the damper and the shell come in contact with each other even if the cylinder block moves toward the shell when vibration is generated in the compressor, so that friction noise may be reduced. In particular, a damping part or portion (hereinafter, referred to as a "rubber damping part") formed of rubber, so that a reduction effect of the friction noise may be implemented more excellently.

Further, a phenomenon in which the mechanism and the shell of the compressor come into contact with each other and are thus damaged or separated may be prevented due to a damping effect of the damper. Furthermore, because the rubber damping part is formed integrally with the damper body formed of plastic, the rubber damping part may be prevented from being separated from the damper body. Also, because a clamp is provided in the damper to support a discharge hose, the discharge hose may be prevented from being damaged due to predetermined heat.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reciprocating compressor, comprising:
a shell in which a discharge pipe is provided;
a drive unit arranged inside the shell and including a stator and a rotor,
a cylinder block arranged above the rotor and including a cylinder having a compression space for a refrigerant;
a rotary shaft rotated by the rotor;
a rotating plate seat provided at the cylinder block and having a shaft insertion portion into which the rotary shaft is inserted;
a muffler coupled to the cylinder, the muffler including a suction space through which the refrigerant is suctioned into the compression space and a discharge space through which the refrigerant compressed in the compression space is discharged; and
a damper provided at the cylinder block, wherein the damper comprises:
a damper base coupled to the cylinder block and formed of plastic; and
a rubber damping portion provided on the damper base material to prevent contact between the damper base material and the shell, wherein the rotating plate seat is formed with at least one insertion hole to which the damper is coupled, and wherein the damper base comprises:
a damper body;
at least one protrusion provided on at least one side of the damper body; and
at least one insertion protrusion that extends downward from the at least one protrusion and is coupled to the at least one insertion hole.

2. The reciprocating compressor of claim 1, wherein the rubber damping portion is insert-injection-molded onto the damper base.

3. The reciprocating compressor of claim 1, further comprising:
a block leg provided at the cylinder block, the block leg extending downward from the rotating plate seat and supported on the stator.

4. The reciprocating compressor of claim 3, wherein the at least one insertion hole is formed on an upper surface of the block leg.

5. The reciprocating compressor of claim 1, wherein the at least one protrusion comprises first and second protrusions provided on opposite sides of the damper body, and wherein the at least one insertion protrusion comprises first and second insertion protrusions that extend from the first and second protrusions, respectively.

6. The reciprocating compressor of claim 1, wherein the rubber damping portion comprises:
   a first portion that surrounds the at least one protrusion; and
   a second portion that extends from the first portion towards the damper body and surrounding at least a portion of the damper body.

7. The reciprocating compressor of claim 5, wherein the rubber damping portion comprises:
   a first damping portion provided on the first protrusion; and
   a second damping portion provided on the second protrusion.

8. The reciprocating compressor of claim 1, wherein:
   the damper body has a bar shape, and
   the at least one protrusion vertically extends from opposite sides of the damper body.

9. The reciprocating compressor of claim 1, further comprising:
   a discharge hose that extends from the muffler toward the discharge pipe; and
   a clamp having first and second clamping portion that defines a hose accommodating space, to support the discharge hose, wherein the clamp extends from the at least one protrusion.

10. The reciprocating compressor of claim 1, wherein the damper body has a bar shape.

11. The reciprocating compressor of claim 1, wherein the at least one protrusion is supported on an upper surface of the rotating plate seat and extends vertically from opposite sides of the damper body.

12. The reciprocating compressor of claim 1, wherein the rubber damping portion is arranged to surround the at least one protrusion.

13. A reciprocating compressor, comprising:
   a shell;
   a drive unit arranged inside of the shell, the drive unit including a stator, a rotor, and a rotary shaft;
   a cylinder block arranged above the rotor, the cylinder block including a cylinder having a compression space for a refrigerant therein, the cylinder block comprising:
      a rotating plate seat having a shaft insertion portion into which the rotary shaft is inserted;
      at least one block leg that extends downward from the rotating plate seat; and
      an insertion hole formed on an upper surface of the block leg;
   a first damper provided at an upper portion of a front side of the cylinder block; and
   a second damper provided at an upper portion of a rear side of the cylinder block, wherein the second damper comprises:
      a damper body formed of plastic;
      at least one insertion protrusion that extends downward from one side of the damper body and which is coupled to the cylinder block the at least one insertion protrusion being coupled to the insertion hole;
      at least one rubber damping portion provided at upper portions of the at least one insertion protrusion; and
      at least one protrusion provided at an upper portion of the damper body, wherein the at least one rubber damping portion is arranged to surround the at least one protrusion.

14. The reciprocating compressor of claim 13, wherein the rubber damping portion includes at least two rubber damping portions provided on opposite sides of the damper body.

15. The reciprocating compressor of claim 13, wherein the damper body has a bar shape.

16. The reciprocating compressor of claim 13, wherein the at least one protrusion is supported on an upper surface of the rotating plate seat and extends vertically from opposite sides of the damper body.

\* \* \* \* \*